(12) United States Patent
Kim

(10) Patent No.: US 6,782,439 B2
(45) Date of Patent: Aug. 24, 2004

(54) BUS SYSTEM AND EXECUTION SCHEDULING METHOD FOR ACCESS COMMANDS THEREOF

(75) Inventor: Jin-soo Kim, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 494 days.

(21) Appl. No.: 09/774,009

(22) Filed: Jan. 31, 2001

(65) Prior Publication Data

US 2002/0010822 A1 Jan. 24, 2002

(30) Foreign Application Priority Data

Jul. 21, 2000 (KR) .......................................... 00-42000

(51) Int. Cl.[7] .............................................. G06F 13/00
(52) U.S. Cl. ........................... 710/110; 710/6; 710/310
(58) Field of Search ............................. 710/6, 7, 310, 710/311, 110

(56) References Cited

U.S. PATENT DOCUMENTS

| | | | |
|---|---|---|---|
| 4,669,079 A | | 5/1987 | Blum |
| 5,253,347 A | | 10/1993 | Bagnoli et al. |
| 5,701,422 A | * | 12/1997 | Kirkland et al. ............ 710/310 |
| 5,905,876 A | * | 5/1999 | Pawlowski et al. ......... 710/112 |
| 6,363,441 B1 | * | 3/2002 | Bentz et al. .................. 710/58 |

FOREIGN PATENT DOCUMENTS

| | | |
|---|---|---|
| EP | 0518527 A2 | 12/1992 |
| EP | 0737924 A2 | 10/1996 |
| JP | 63-155249 | 6/1988 |
| JP | 2-101560 | 4/1990 |
| JP | 5-197671 | 8/1993 |
| JP | 6-119282 | 4/1994 |
| JP | 7-334453 | 12/1995 |
| JP | 8-44662 | 2/1996 |
| JP | 8-63427 | 3/1996 |
| JP | 8-339345 | 12/1996 |
| JP | 11-96107 | 4/1999 |
| WO | WO 93/10499 A1 | 5/1993 |

* cited by examiner

*Primary Examiner*—Glenn A. Auve
(74) *Attorney, Agent, or Firm*—Sughrue Mion, PLLC

(57) ABSTRACT

A bus system and execution scheduling method used for the bus system are provided. The execution scheduling method used for the bus system includes the steps of (a) transmitting one or more access commands issuing from one or more master devices to corresponding slave devices; (b) storing the transmitted access commands; and (c) the slave devices executing the stored access commands in the order in which execution preparation of access commands is completed. According to the method, the order of execution of the access commands is adjusted, thereby providing a bus system having improved data processing speed and the execution scheduling method thereof.

13 Claims, 7 Drawing Sheets

BUS SYSTEM AND EXECUTION SCHEDULING METHOD FOR ACCESS COMMANDS THEREOF

BACKGROUND OF THE INVENTION

1. Field of the Invention

The present invention relates to a bus system and execution scheduling method for access commands thereof, and more particularly, to a bus system including a plurality of slave devices, in which commands issued by master devices are executed by slave devices in the order in which an execution preparation is made, and an execution scheduling method thereof. The present application is based on Korean Patent Application No. 2000-42000 filed on Jul. 21, 2000, which is incorporated herein by reference.

2. Description of the Related Art

A bus master is a system module that is able to initiate read and write operations by providing address and control information. A bus slave is a system module that responds to a read or write operation within a given address-space range. Representative examples of master and slave devices are processors and memories. A master device and a slave device communicate with each other through a bus. In other words, a command from the master device are transmitted to the slave device, and execution of the transmitted command is completed by transmitting predetermined data from the slave device to the master device or from the master device to the slave device.

In order for a plurality of master devices to use a common bus fairly and effectively, various conventional arbitration methods have been developed and applied. However, conventional arbitration methods involve arbitrating ownership of an address/control bus and a data bus. In other words, a bus arbiter only serves to arbitrate ownership of a bus, and a master device, at that point, has the authority to control and use the bus. Thus, if ownership of a data bus and address/control buses is given to a specific master device according to an arbitration algorithm, the master device exclusively owns the data bus and address/control bus until the execution of commands is complete.

Accordingly, if a command transmitted to a slave device that is connected to various local data buses, the transfer bandwidth of which is narrower than a main data bus, such as an input/output (I/O) bus connected to an I/O device and a ROM bus coupled to a boot ROM, is to be executed, the main data bus lies idle during some clock cycles. This is because the main data bus is monopolized by a master device issuing a command until data to be transferred passes through the local data bus, which is slower than the main data bus in data transfer, i.e., execution of the command is completed. In the case of a write command in which data is transferred from a main data bus to a local data bus, idle clock cycles of the main data bus can be reduced by keeping data in a bridge device provided between the main data bus and the local data bus and completing monopoly of the main data bus by the master device. However, in the case of a read command in which data must be transferred to the master device through the main data bus, the master device needs to wait with the main data bus lying idle, until the data transferred from the local data bus is delivered to the main data bus. Accordingly, the operational speed of the overall system is reduced by a large number of idle clock cycles of the main data bus.

SUMMARY OF THE INVENTION

To solve the above problems, it is an objective of the present invention to provide a bus system having an improved data transfer speed by scheduling the execution of commands using an execution scheduling method for the bus system.

Accordingly, to achieve the above objective, the present invention provides a method of scheduling execution of access commands including the steps of (a) transmitting one or more access commands issuing from one or more master devices to corresponding slave devices, (b) storing the transmitted access commands, and (c) the slave devices executing the stored access commands in the order in which execution preparation of the access commands is completed. The step (a) preferably includes the steps of (a1) temporarily storing the access commands, and (a2) transmitting the stored access commands to the corresponding slave devices on a first-in-first-out (FIFO) basis. The step (c) includes the steps of: (c1) receiving a notice indicating that the execution preparation is completed from the slave device, and (c2) sending instructions to the corresponding slave device to begin execution of the access command. In this case, the access command issuing from the master device is transmitted from a predetermined arbiter as a result of arbitration.

The present invention also provides a bus system including an arbiter for outputting one or more access commands from one or more master devices in an order according to a predetermined arbitration result, and an execution scheduler granting a data bus to slave devices corresponding to the access commands output from the arbiter so that the access commands may be executed in the order in which execution preparation of the access commands is completed. The execution scheduler preferably includes an access command distribution unit for receiving the access commands output from the arbiter and transmitting the access commands to the corresponding slave devices, and an execution scheduling unit for transferring an execution starting signal of the transmitted access command to a slave device, which has sent an execution preparation completion signal and has received the access commands from the access command distribution unit.

The slave device preferably includes an execution command storing unit for storing the access command transmitted from the execution scheduler, and an execution unit for transmitting the execution preparation completion signal to the execution scheduler, executing the access command stored in the execution command storing unit if the execution starting signal is received, and transferring an execution completion signal to the execution scheduling unit if the execution is completed.

Preferably, the access command distribution unit includes the command storing unit for storing the access command received from the arbiter, and the command storing unit includes a command storage queue for storing the access commands and a command storage queue controller for controlling the command storage queue.

The execution scheduling unit preferably includes an identifier storage queue including one or more storage cells for storing an identifier of a corresponding slave device, which receives the access command through the access command distribution unit, an identifier storage queue controller for controlling the identifier storage queue, comparators, each of which corresponds to a respective storage cell, for determining whether or not an identifier stored in the storage cell is the same as an identifier of the slave device transmitting the execution preparation completion signal, and a decoder for transmitting the execution starting signal to the slave device, which transmits the execution preparation completion signal, if both identifiers are determined to be the same by the comparator.

The execution command storage unit preferably includes an execution command storage queue for storing the access commands, and an execution command storage queue controller for controlling the execution command storage queue.

BRIEF DESCRIPTION OF THE DRAWINGS

The above objective(s) and advantages of the present invention will become more apparent by describing in detail a preferred embodiment thereof with reference to the attached drawings in which.

DETAILED DESCRIPTION OF THE INVENTION

Figure 1:
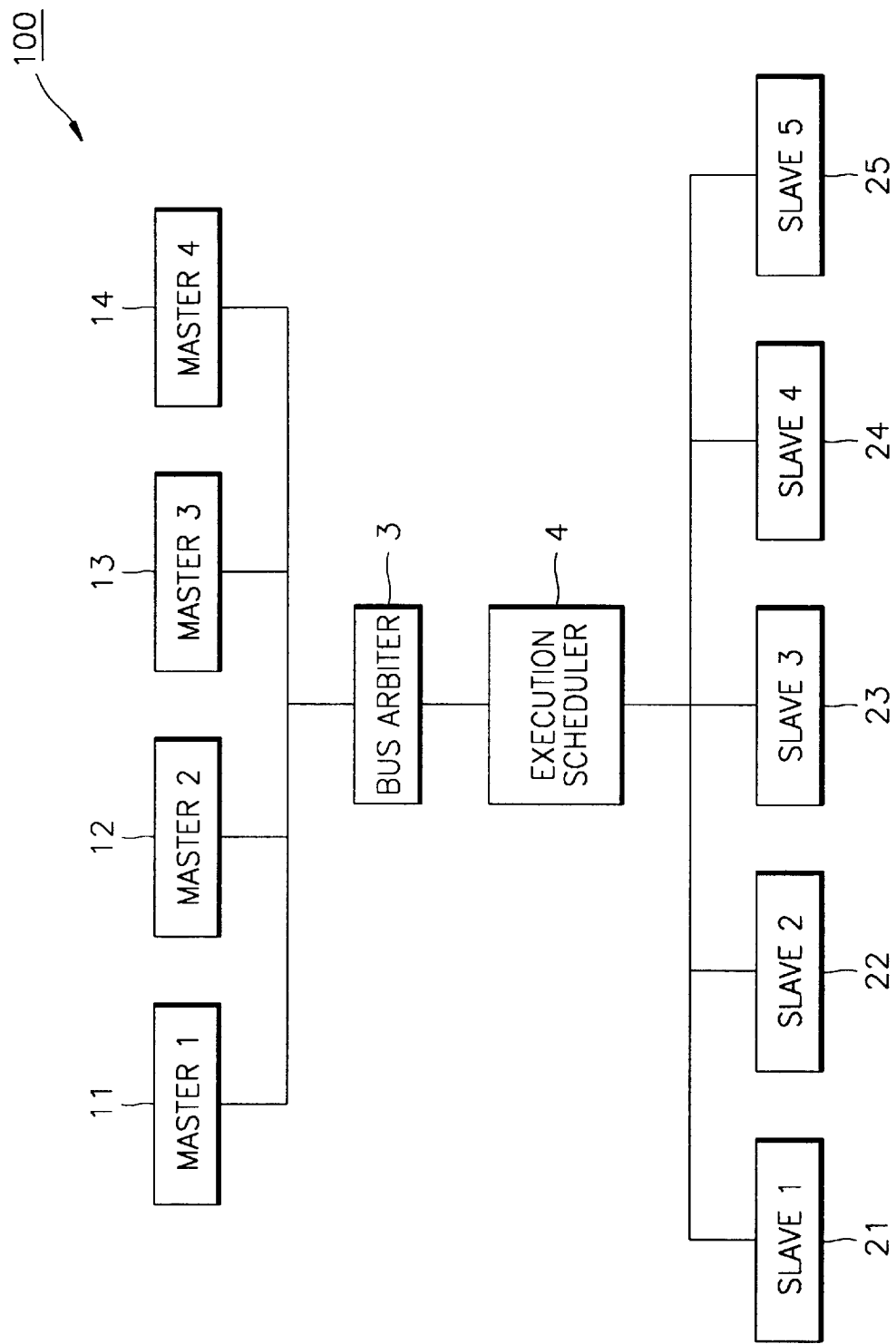
FIG. 1 is a schematic view of a bus system according to a preferred embodiment of the present invention.

Referring to FIG. 1, a bus system 100 includes a plurality of master devices 11, 12, 13 and 14, a plurality of slave devices 21, 22, 23, 24, and 25, a bus arbiter 3, and an execution scheduler 4. The plurality of master devices 11–14, and the plurality of slave devices 21–25 are interconnected by a data bus which is not shown for simplification. The data bus includes a main data bus and a local data bus which function at different transfer speeds.

The master devices 11–14 generally refer to a processor or a direct memory access (DMA) controller, and the slave devices 21–25 refer to memories such as a RAM and a ROM, an I/O device, or other peripheral devices. Each of the master devices 11–14 may become a slave device controlled by another master device 11–14. Furthermore, the number of master devices and slave devices may vary when necessary.

A bus arbiter in a conventional bus system grants ownership of an address/control bus to a master device, and allows the master device to directly regulate the slave device and handle a response from the slave device. However, the bus arbiter according to the present invention does not grant ownership of an address/control bus to a master device. Rather than doing so, the bus arbiter 3 receives information (hereinafter referred to as "access command") necessary for data transfer such as an address, a read/write flag, the size of data transmitted in blocks and a bit width output from the master devices 11–14, and then transmits the access commands directly to the slave devices 21–25 and manages the slave devices 21–25.

The execution scheduler 4 sends out the access command transmitted from the bus arbiter 3 to a corresponding slave device 21, 22, 23, 24, or 25, and then allows the slave device 21, 22, 23, 24, or 25 to execute the access command in the order that an execution preparation is completed. In this case, execution of the access command means that the transfer of data intended by an access command has been completed.

Figure 2:
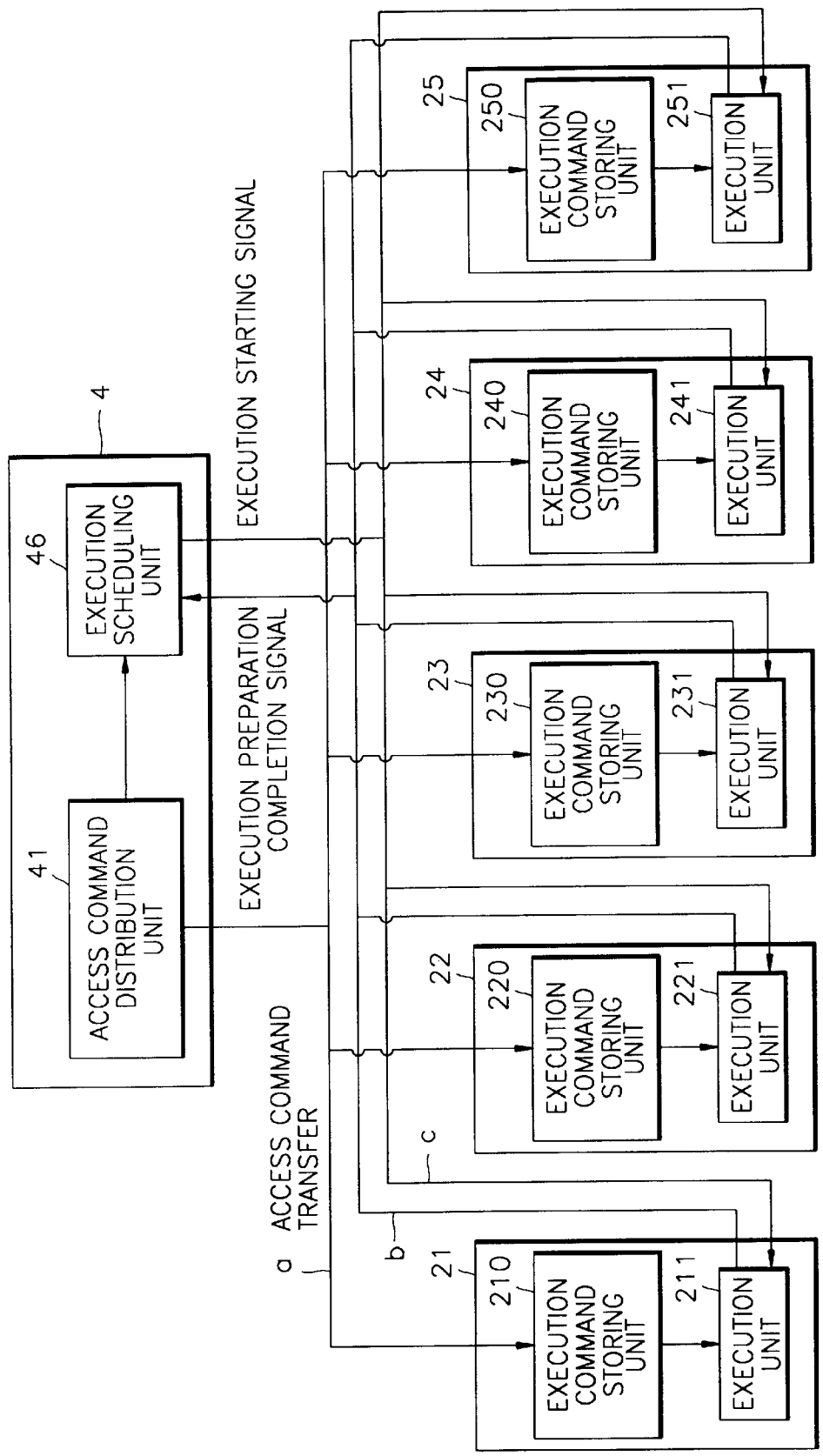
FIG. 2 is a block diagram of the execution scheduler and the slave devices of FIG. 1.

Referring to FIG. 2, which is a block diagram of the execution scheduler 4 and the slave devices 21–25 of FIG. 1, the execution scheduler 4 includes an access command distribution unit 41 for transmitting the access command output from the bus arbiter 3 to a corresponding slave device 21, 22, 23, 24, or 25, and an execution scheduling unit 46 for transferring an execution starting signal of the transmitted access command to the slave device 21, 22, 23, 24, or 25 that sends out an execution preparation completion signal and has received access commands from the access command distribution unit 41.

Each of the slave devices 21, 22, 23, 24, and 25 include an execution command storing unit 210, 220, 230, 240, and 250, and an execution unit 211, 221, 231, 241, and 251, respectively. The execution command storing unit 210, 220, 230, 240, or 250 stores the access command transmitted from the execution scheduler 4. The execution unit 211, 221, 231, 241, or 251 executes the access command stored in the execution command storing unit 210, 220, 230, 240, or 250, and after the completion of execution, it transmits an execution completion signal to the execution scheduling unit 46.

Figure 3:
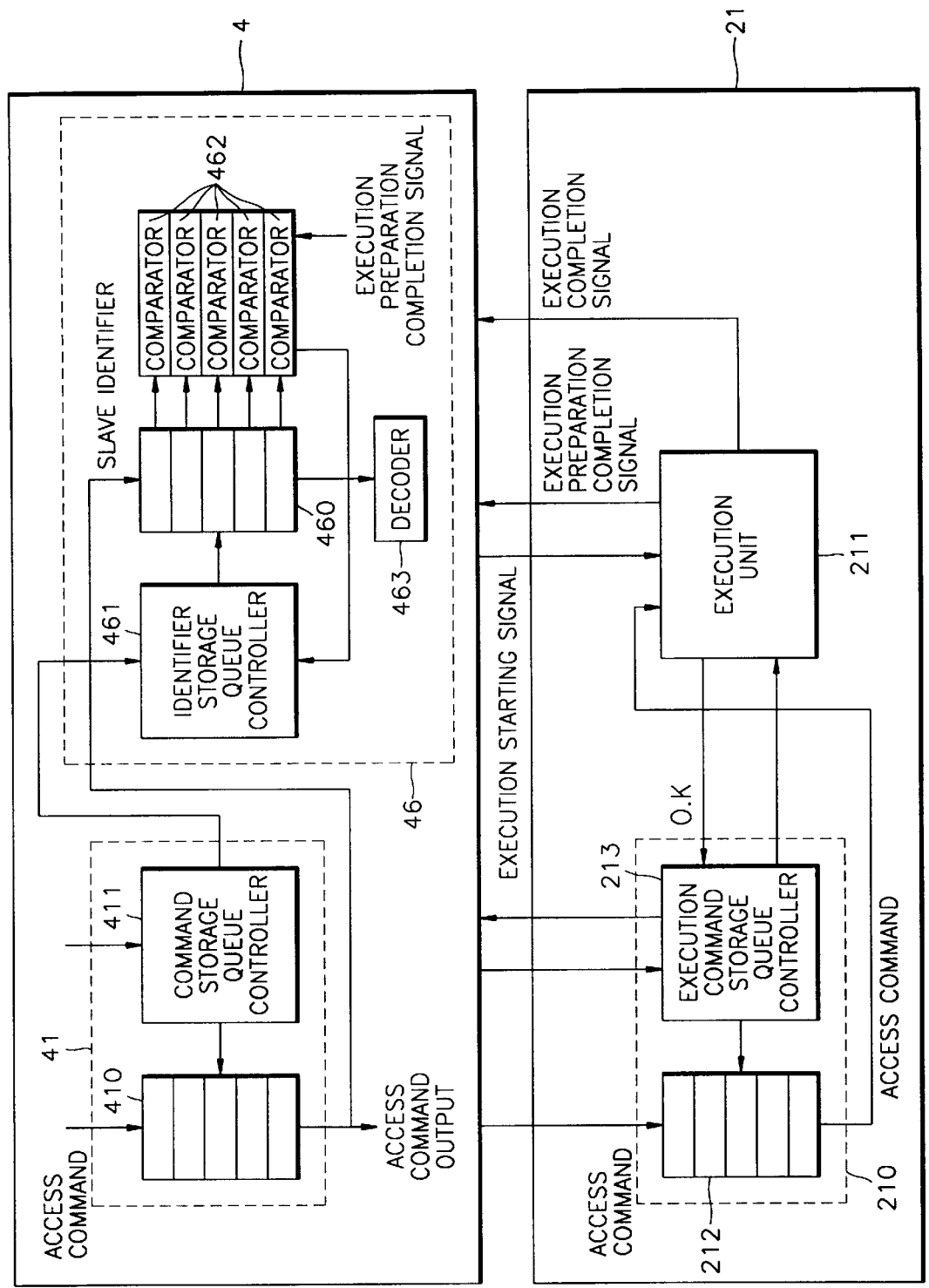
FIG. 3 is a detailed block diagram of the execution scheduler and the slave device of FIG. 2.

FIG. 3 is a detailed block diagram showing the execution scheduler 4 and the slave device 21 of FIG. 2. The remaining slave devices 22–25 have the same configuration as the slave device 21 and thus the configurations thereof will not be described. Referring to FIG. 3, the access command distribution unit 41 of the execution scheduler 4 includes a command storage queue 410, and a command storage queue controller 411 for controlling the command storage queue 410, which is a command storing unit for storing the access command received from the bus arbiter 3. The execution scheduling unit 46 of the execution scheduler 4 includes an identifier storage queue 460, which is an identifier storing unit for storing identifiers of the slave devices 21–25, comparators 462, and a decoder 463, and an identifier storage queue controller 461.

The identifier storage queue 460 includes one or more storage cells for storing an identifier of slave device 21, 22, 23, 24, or 25, which receives an access command through the access command distribution unit 41, and the identifier storage queue controller 461 controls the input and output of the identifier storage queue 460. Each comparator 462 corresponding to each storage cell determines whether or not an identifier stored in each storage cell is identical to an identifier of slave device 21, 22, 23, 24, or 25, which transmits an execution preparation completion signal. If both identifiers are determined to be the same by the comparator 462, then the decoder 463 transmits an execution starting signal to the slave device 21, 22, 23, 24, or 25 which has transmitted the execution preparation completion signal. In this case, the comparator 462 and the decoder 463 are named in a logical sense, and various configurations thereof can be implemented.

The execution command storing unit 210 of the slave device 21 includes an execution command storage queue 212 for storing access commands, and an execution command storage queue controller 213 for controlling the input and output of the execution command storage queue 212.

Figure 4:
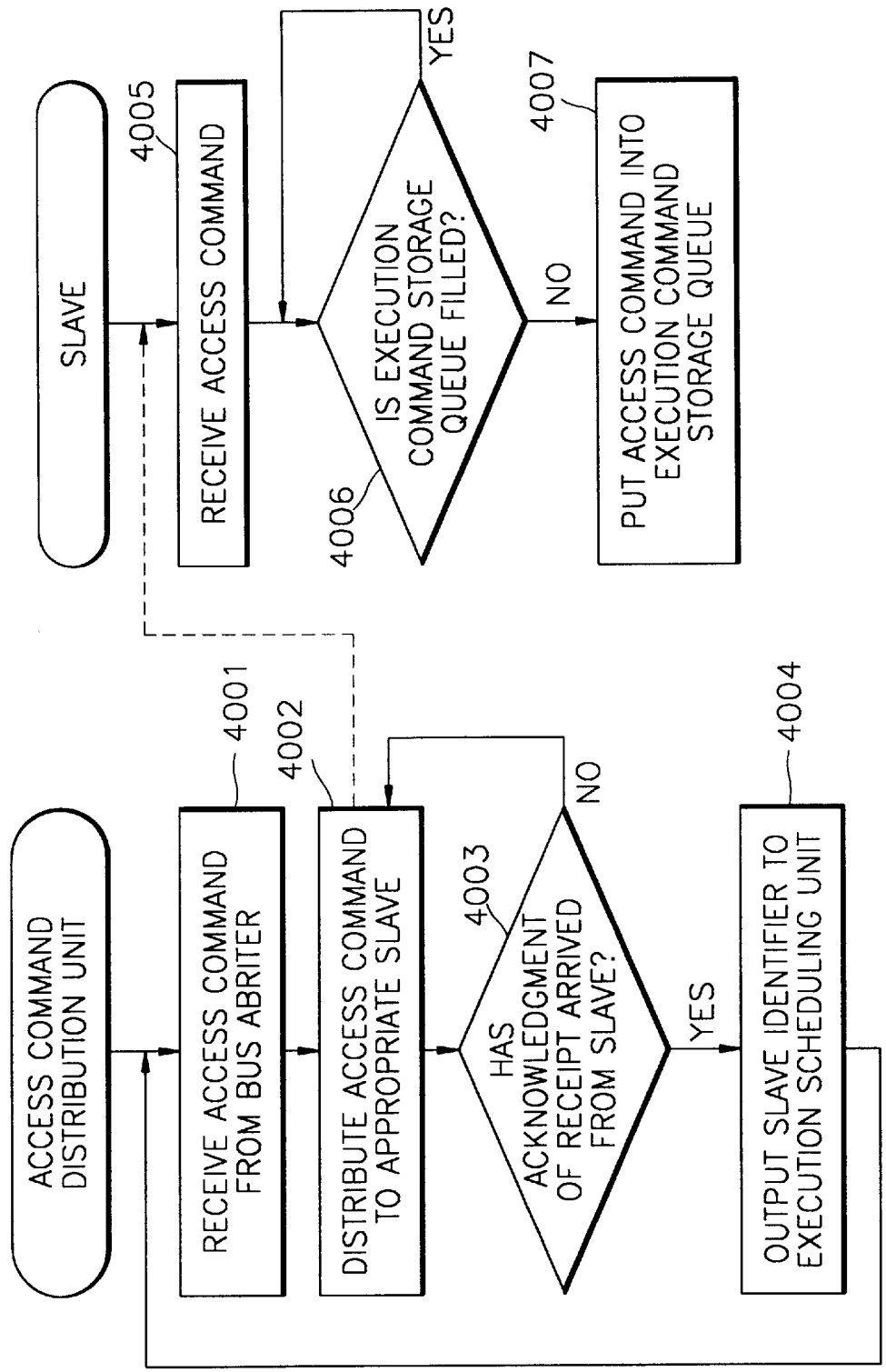
FIG. 4 is a flowchart for explaining a process in the access command distribution unit of the execution scheduler and a corresponding slave device.

Based on the above configuration, a method of scheduling the execution of an access command according to a preferred embodiment of the invention will now be described. First, a process executed in the execution scheduler 4 will be described. Referring to FIG. 4, which is a flowchart for explaining a process in the access command distribution unit 41 of the execution scheduler 4 and a corresponding slave device, the access command distribution unit 41 receives an access command output from the bus arbiter 3 in an order according to a predetermined arbitration result (step 4001). The received access command is stored in the command storage queue 410 serving as a first-in-first-out (FIFO) queue.

The access command distribution unit 41 decodes the access command stored in the command storage queue 410 based on an address map for identifying a corresponding slave device 21, 22, 23, 24, or 25, and then transmits the access command to the corresponding slave device 21, 22, 23, 24, or 25 (step 4002). The slave device 21, 22, 23, 24, or 25 receiving the access command acknowledges receipt of the access command to the access command distribution unit 41. This acknowledgment of the access command arrives at the access command distribution unit 41 (step 4003). Upon receipt of acknowledgment of the access command, the access command distribution unit 41 outputs an identifier of one of the slave devices 21, 22, 23, 24, or 25 whose acknowledgment of the access command has arrived to the execution scheduling unit 46 (step 4004). Meanwhile, the access command distributed in the step 4002 is received by a corresponding slave device 21, 22, 23, 24, or 25 (step 4005). The corresponding slave device 21, 22, 23, 24, or 25 checks whether the execution command storage queue 212 is completely filled (step 4006), and if there are any vacant storage cells, the received access command is put into the execution command storage queue 212 (step 4007).

Figure 5:
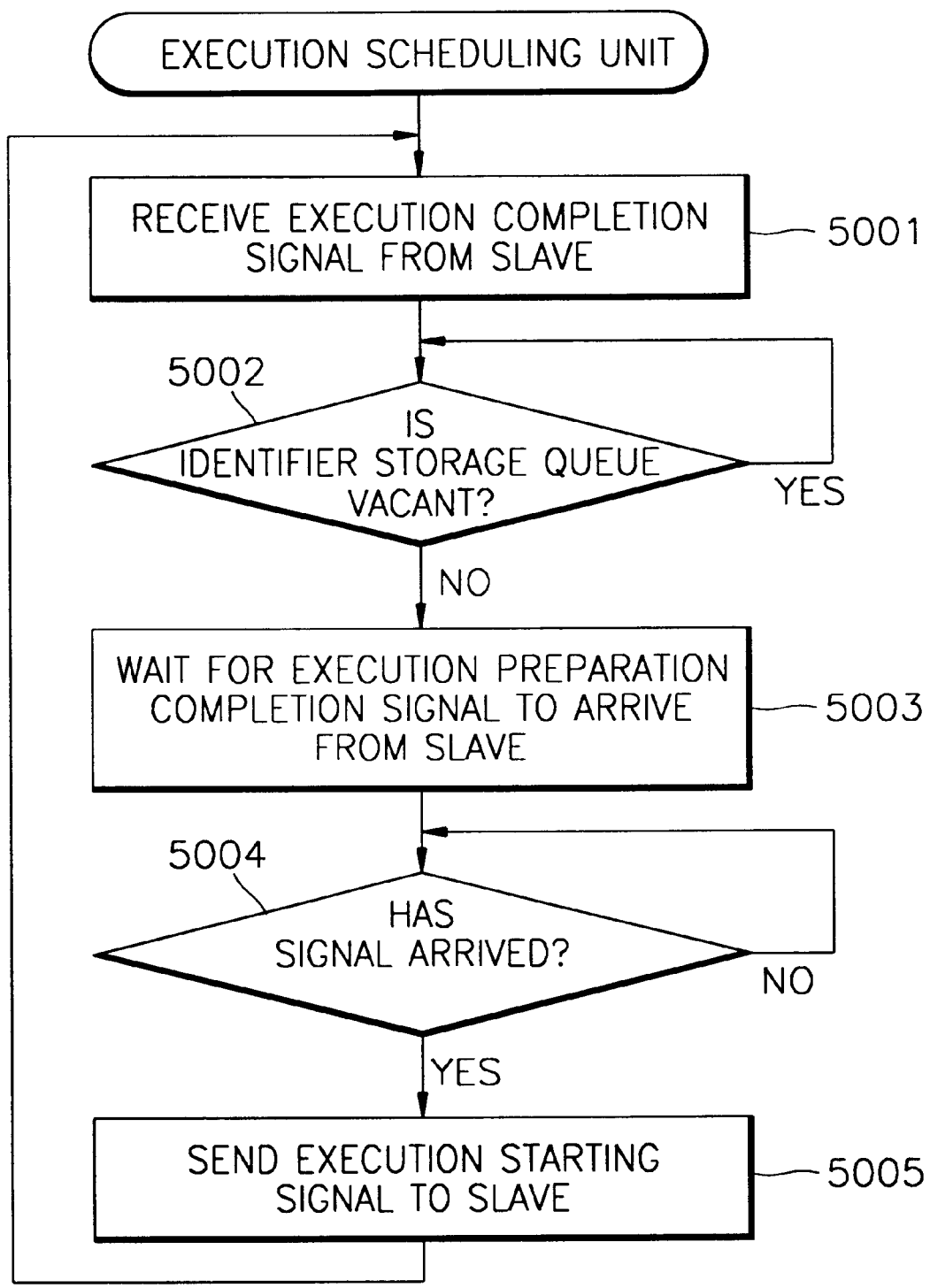
FIG. 5 is a flowchart for explaining a process in the execution scheduling unit of the execution scheduler.

FIG. 5 is a flowchart for explaining a process in the execution scheduling unit 46 of the execution scheduler 4. Referring to FIGS. 3 and 5, if an execution completion signal of the access command is received from a predetermined slave device 21, 22, 23, 24, or 25 (step 5001), the execution scheduling unit 46 checks whether each storage cell provided in the identifier storage queue 460 is vacant in order to check whether there is an access command to be executed (step 5002). If an identifier is stored in the identifier storage queue 460, the execution scheduling unit 46 waits for an execution preparation completion signal of the access command to arrive from slave device 21, 22, 23, 24, or 25 (step 5003). If an execution preparation completion signal arrives from one of the slave devices 21, 22, 23, 24, or 25 corresponding to any one of the stored identifiers (step 5004), then a check is made by the comparator 462 provided in each storage cell as to whether an identifier stored in the corresponding storage cell is the same as an identifier of the slave device 21, 22, 23, 24, or 25, from which the execution preparation completion signal arrives. If both are the same, the identifier storage queue controller 461 outputs the identifier of the slave device 21, 22, 23, 24, or 25, which is stored in the corresponding storage cell, from the identifier storage queue 460 to the decoder 463. The decoder 463 decodes the identifier output from the identifier storage queue 460 and then sends an execution starting signal to the slave device 21, 22, 23, 24, or 25 corresponding to the decoded result (step 5005).

Next, a process in the slave devices 21–25 will now be described. In this case, the process is divided into two types: one process is for a slave device requiring no execution schedule because there is only access to a main data bus, and the other process is for a slave device requiring an execution schedule.

Figure 6:
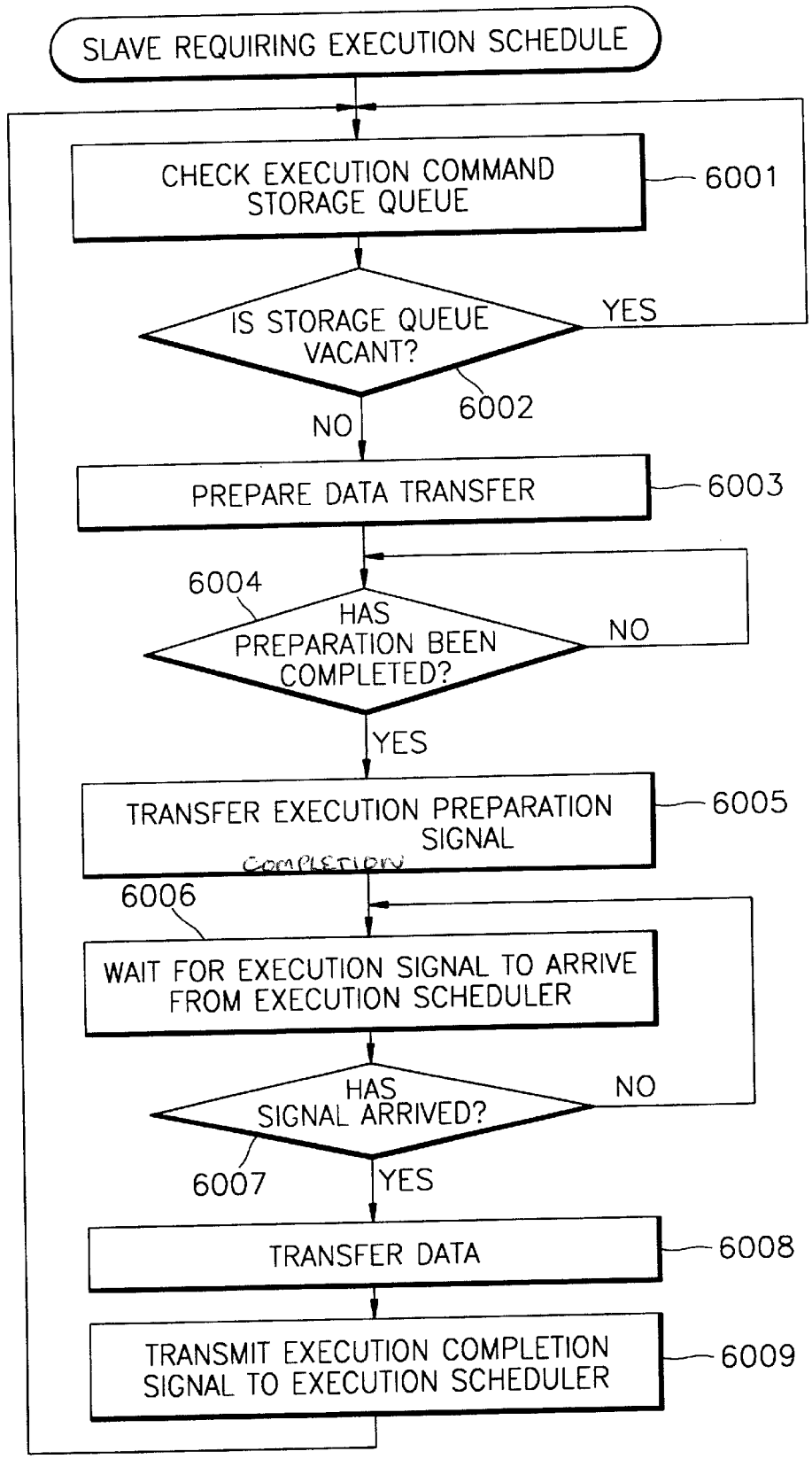
FIG. 6 is a flowchart for explaining a process in the slave device requiring an execution schedule.

FIG. 6 is a flowchart for explaining a process in a slave device requiring an execution schedule. For convenience of explanation, it is assumed that the slave device requiring an execution schedule is the slave device 21 of FIG. 3. Referring to FIG. 6, the execution unit 211 of the slave device 21 checks, through the execution command storage queue controller 213, whether or not the access command is stored in the execution command storage queue 212 (step 6001). If the access command is stored in the execution command storage queue 212 (step 6002), the access command execution storage queue controller 213 outputs the access command from the execution command storage queue 212 on a FIFO basis, and the execution unit 211 prepares data transfer for execution of the access command input from the execution command storage queue 212 (step 6003).

If the data transfer is completed (step 6004), the execution unit 211 sets an execution preparation completion signal line on in order to transmit an execution preparation completion signal to the execution scheduling unit 46 (step 6005). The execution unit 211, which has transmitted the execution preparation completion signal, waits for an execution starting signal to arrive from the execution scheduling unit 46 (step 6006). If the execution starting signal arrives from the execution scheduling unit 46, the execution unit 211 transmits prepared data to a corresponding master device 11, 12, 13, or 14 (step 6008). If the data transfer is completed, the execution unit 211 transmits an execution completion signal to the execution scheduling unit 46 (step 6009). Upon receipt of the execution completion signal, the execution scheduler 4 checks that a data bus is idle, and then performs execution scheduling for another access command stored in the identifier storage queue 460.

Figure 7:
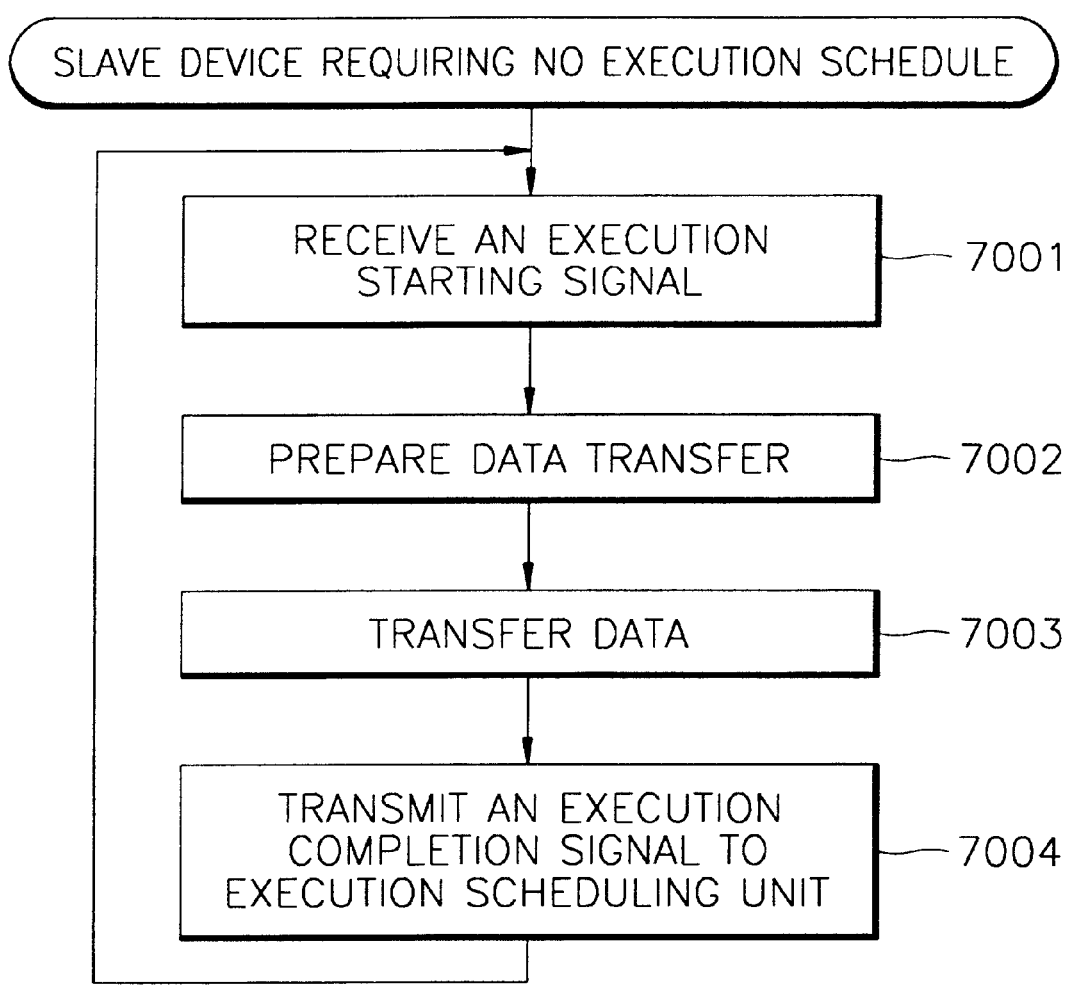
FIG. 7 is a flowchart for explaining a process in the slave device requiring no execution schedule.

FIG. 7 is a flowchart for explaining a process in a slave device requiring no execution schedule. For convenience of explanation, it is assumed that a slave device requiring no execution schedule is the slave device 21 of FIG. 3. If an access command is stored in the execution command storage queue 212, then an identifier of the slave device 21 is stored in the identifier storage queue 460 of the execution scheduler 4. At this point, since the execution unit 211 always sets an execution preparation completion signal line on, when the identifier of the slave device 21 is input to the identifier storage queue 460, the execution scheduling unit 46 of the execution scheduler 4 promptly transmits an execution starting signal to the execution unit 211 which receives the execution starting signal (step 7001).

Then, the execution unit 211 prepares data transfer for execution of the access command input from the execution command storage queue 212 (step 7002). If data transfer is prepared, the execution unit accesses a main data bus and transfers data to a corresponding master device 11, 12, 13, or 14 (step 7003). If the data transfer is completed, the execution unit 211 transmits an execution completion signal to the execution scheduling unit 46 (step 7004). Upon receipt of the execution completion signal, the execution scheduler 4 confirms that the data bus is idle, and then performs execution scheduling for another access command that corresponds to identifiers stored in the identifier storage queue 460.

The execution scheduling method for the access command, according to a preferred embodiment of the invention, is highly effective in a bus system including a slave device that requires access to a local data bus which is slower in data transfer speed than a main data bus. This is because the wait time of a master bus can be minimized by the execution scheduling method when data is transferred from the local data bus to the main data bus. However, in the case of a slave device requiring substantially no execution scheduling since it accesses only a main data bus, providing a separate module for execution scheduling increases the complexity of hardware and software. For this reason, in the embodiment described above, if a slave device 21, 22, 23, 24, or 25 accesses only a main data bus, the slave device 21, 22, 23, 24, or 25 always activates an execution preparation completion signal line, thereby promptly receiving an execution starting signal from the execution scheduler 4 to transfer data if a main data bus is idle.

Although the embodiment has been described with reference to a bus system including a main data bus and a local data bus, of which the main data bus transfers data at higher speed, the present invention will not be restricted to this. For example, even after the order of execution of access commands is determined by a predetermined arbitration algorithm, and only if a bus system has a plurality of slave devices, execution scheduling may be readjusted so that an access command may be carried out by the slave device as soon as an execution preparation is completed, thereby improving the processing speed of the entire system.

As described in the foregoing, the present invention readjusts the command execution order so that a slave device that first completes execution preparation may first execute a command or access a data bus, thereby providing a bus system having improved overall data processing speed and an access command execution scheduling method thereof. In particular, according to the present invention, if a slave device is connected to a local data bus in which data is transferred at a slower speed than a main data bus, the slave device can effectively access the local data bus, thereby reducing idle clock cycles of the main data bus and improving the processing speed of the entire system.

What is claimed is:

1. A method of scheduling execution of an access command comprising the steps of:
   (a) transmitting one or more access commands issuing from one or more master devices to corresponding slave devices;
   (b) storing the transmitted access commands; and
   (c) the slave devices executing the stored access commands in the order in which execution preparation of the access commands is completed,
   wherein the step (a) comprises the steps of:
      (a1) temporarily storing the access commands, and
      (a2) transmitting the stored access commands to the corresponding slave devices; and
      wherein in the step (a2), the stored access commands are transmitted on a first-in-first-out (FIFO) basis.

2. A bus system comprising:
   an arbiter for outputting one or more access commands from one or more master devices in an order according to a predetermined arbitration result; and
   an execution scheduler granting a data bus to slave devices corresponding to the access commands output from the arbiter so that the access commands may be executed in the order in which execution preparation of the access commands are completed,
   wherein the execution scheduler comprises:
      an access command distribution unit for receiving the access commands output from the arbiter and transmitting the access commands to the corresponding slave devices; and
      an execution scheduling unit for transferring an execution starting signal of the transmitted access command to a slave device, and
      wherein the slave device comprises:
         an execution command storing unit for storing the access command transmitted from the execution scheduler; and
         an execution unit for transmitting the execution preparation completion signal to the execution scheduler, executing the access command stored in the execution command storing unit if the execution starting signal is received, and transferring an execution completion signal to the execution scheduling unit if the execution is completed.

3. The bus system of claim 2, wherein the execution scheduling unit transfers the execution starting signal of the transmitted access command to a slave device which has received the access commands from the access command distribution unit and has sent an execution preparation signal.

4. The bus system of claim 2, wherein the access command distribution unit comprises a command storing unit for storing the access commands received from the arbiter.

5. The bus system of claim 4, wherein the execution command storing unit comprises a command storage queue for storing the access commands and a command storage queue controller for controlling the command storage queue.

6. The bus system of claim 5, wherein the execution scheduling unit comprises:
   an identifier storage queue including one or more storage cells for storing an identifier of a corresponding slave device, which receives the access command through the access command distribution unit;
   an identifier storage queue controller for controlling the identifier storage queue;
   comparators, each of which corresponds to a respective storage cell, for determining whether or not an identifier stored in the storage cell is the same as an identifier of the slave device transmitting the execution preparation completion signal; and
   a decoder for transmitting the execution starting signal to the slave device, which transmits the execution preparation completion signal.

7. The bus system of claim 6, wherein the decoder transmits the execution preparation completion signal if both identifiers are determined to be the same by the comparator.

8. The bus system of claim 4, wherein the execution scheduling unit comprises:
   an identifier storage queue for storing an identifier of a corresponding slave device, which receives the access command through the access command distribution unit;
   an identifier storage queue controller for controlling the identifier storage queue;
   comparators, each of which corresponds to a respective storage cell, for determining whether or not an identifier stored in the storage cell is the same as an identifier of the slave device transmitting the execution preparation completion signal; and
   a decoder for transmitting the execution starting signal to the slave device, which transmits the execution preparation completion signal.

9. The bus system of claim 8, wherein the decoder transmits the execution preparation completion signal if both identifiers are determined to be the same by the comparator.

10. The bus system of claim 8, wherein the identifier storage queue includes one or more storage cells.

11. The bus system of claim 2, wherein the execution scheduling unit comprises:
   an identifier storage queue for storing an identifier of a corresponding slave device, which receives the access command through the access command distribution unit;
   an identifier storage queue controller for controlling the identifier storage queue;

comparators, each of which corresponds to a respective storage cell, for determining whether or not an identifier stored in the storage cell is the same as an identifier of the slave device transmitting the execution preparation completion signal; and a decoder for transmitting the execution starting signal to the slave device, which transmits the execution preparation completion signal, if both identifiers are determined to be the same by the comparator.

12. The bus system of claim 11, wherein the identifier storage queue includes one or more storage cells.

13. The bus system of claim 2, wherein the execution command storing unit includes an execution command storage queue or storing the access commands, and an execution command storage queue controller for controlling the execution command storage queue.

* * * * *